US007949696B2

(12) United States Patent
Ishii et al.

(10) Patent No.: US 7,949,696 B2
(45) Date of Patent: May 24, 2011

(54) FLOATING-POINT NUMBER ARITHMETIC CIRCUIT FOR HANDLING IMMEDIATE VALUES

(75) Inventors: Masaaki Ishii, Saitama (JP); Koichi Hasegawa, Kanagawa (JP); Hiroaki Sakaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1310 days.

(21) Appl. No.: 11/280,244

(22) Filed: Nov. 17, 2005

(65) Prior Publication Data

US 2006/0112160 A1 May 25, 2006

(30) Foreign Application Priority Data

Nov. 25, 2004 (JP) ................................. 2004-341323

(51) Int. Cl.
*G06F 7/00* (2006.01)
*G06F 7/38* (2006.01)
*G06F 9/30* (2006.01)

(52) U.S. Cl. ......... 708/204; 708/490; 708/495; 712/208
(58) Field of Classification Search ................ 708/204
See application file for complete search history.

(56) References Cited

U.S. PATENT DOCUMENTS

| 4,675,809 | A | * | 6/1987 | Omoda et al. | 712/222 |
| 4,722,068 | A | * | 1/1988 | Kuroda et al. | 708/625 |
| 5,161,117 | A | * | 11/1992 | Waggener, Jr. | 708/204 |
| 5,268,855 | A | * | 12/1993 | Mason et al. | 708/513 |
| 6,108,772 | A | * | 8/2000 | Sharangpani | 712/221 |
| 6,128,726 | A | * | 10/2000 | LeComec | 712/221 |
| 6,671,796 | B1 | * | 12/2003 | Sudharsanan et al. | 712/222 |
| 2005/0055389 | A1 | * | 3/2005 | Ramanujam | 708/204 |

FOREIGN PATENT DOCUMENTS

| JP | 61-103251 | A | 5/1986 |
| JP | 03-250324 | A | 11/1991 |
| JP | 05-100822 | A | 4/1993 |
| JP | 06-337782 | A | 12/1994 |
| JP | 10-031618 | A | 2/1998 |
| JP | 10-031618 | * | 3/1998 |
| JP | 2004-213622 | A | 7/2004 |

OTHER PUBLICATIONS

"IA-32 Intel® Architecture Software Developer's Manual, vol. 1: Basic Architecture", Intel Corporation, 2004.
Japanese Office Action issued Oct. 29, 2009 for corresponding Japanese Applcation No. 2004-341323.
Japanese Office Action issued Apr. 6, 2010 for corresponding Japanese Application No. 2004-341323.

* cited by examiner

*Primary Examiner* — Lewis A Bullock, Jr.
*Assistant Examiner* — Hang Pan
(74) *Attorney, Agent, or Firm* — Rader, Fishman & Grauer PLLC

(57) ABSTRACT

Disclosed herein is a floating-point number arithmetic circuit for efficiently supplying data to be performed arithmetic operation. The floating-point number arithmetic circuit includes an floating-point number arithmetic unit for performing a predetermined floating-point number arithmetic operation on a floating-point number of a predetermined precision, and a converting circuit for converting data into the floating-point number of predetermined precision and supplying the floating-point number of the predetermined precision to at least either one of input terminals of the floating-point number arithmetic unit.

11 Claims, 11 Drawing Sheets

F I G . 1
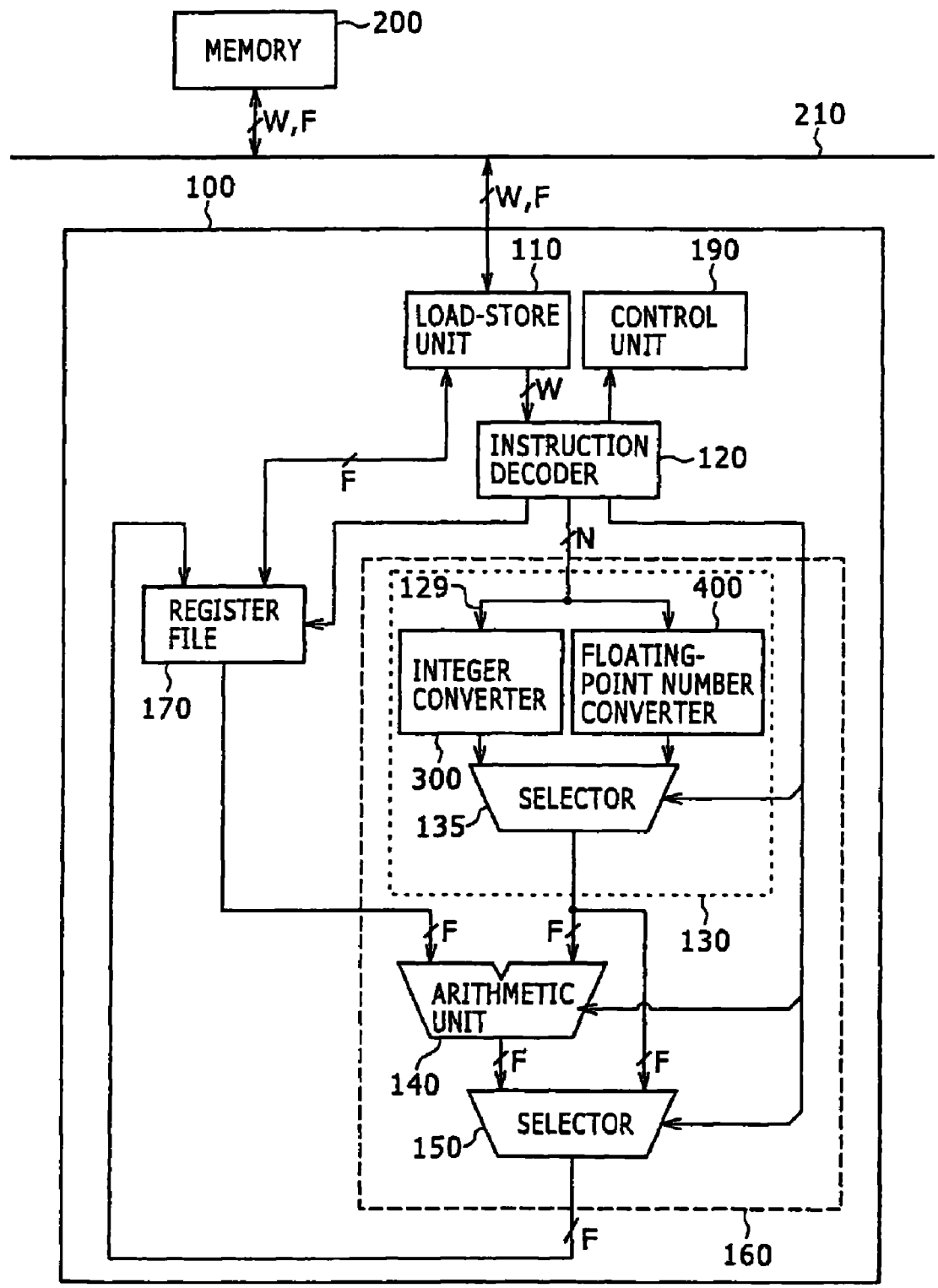

IMMEDIATE INSTRUCTION FORMAT

IMMEDIATE STORAGE INSTRUCTION (FLOATING DECIMAL)

IMMEDIATE STORAGE INSTRUCTION (INTEGER)

IMMEDIATE ADDITION INSTRUCTION

IMMEDIATE MULTIPLICATION INSTRUCTION

IMMEDIATE DIVISION INSTRUCTION

16-BIT FLOATING-POINT NUMBER

POSITIVE ZERO (+0)

NEGATIVE ZERO (-0)

POSITIVE INFINITY (+∞)

NEGATIVE INFINITY (-∞)

NONNUMERIC (NaN)

FIG.4

| EXPONENTIAL PART 722 | PRIOR TO BIAS | REMARKS |
|---|---|---|
| 0 | -15 | ±0, UNNORMALIZED NUMBER |
| 1 | -14 | EXPONENT ($10^{-14}$ - $10^{+15}$) |
| ⋮ | ⋮ | |
| 30 | +15 | |
| 31 | +16 | ±∞, NONNUMERIC (NaN) |

FLOATING-POINT NUMBER ARITHMETIC CIRCUIT FOR HANDLING IMMEDIATE VALUES

CROSS REFERENCES TO RELATED APPLICATIONS

The present invention contains subject matter related to Japanese Patent Application JP 2004-341323 filed in the Japanese Patent Office on Nov. 25, 2004, the entire contents of which being incorporated herein by reference.

BACKGROUND OF THE INVENTION

The present invention relates to a floating-point number arithmetic circuit, and more particularly to a floating-point number arithmetic circuit for handling immediate values and a processor for executing floating-point number instructions with immediate values.

If data which an arithmetic circuit is to operate on is stored in a memory, then when the data is to be supplied to the arithmetic unit, the data needs to be read from the memory. Some processors handle data that is stored in a memory as data to operate on by providing a field (a memory operand) which specifies an address of the memory where the data to operate on is stored, as an operand of an arithmetic instruction.

However, if a memory operand is provided in an arithmetic instruction, then it is necessary to access the specified memory address after the arithmetic instruction is interpreted. As a result, it takes a long time until all the data becomes available.

According to a load-store architecture exemplified by RISCs (Reduced Instruction Set Computers) in recent years, a loading instruction for reading data from a memory into a register and an arithmetic instruction for operating on the data are separate from each other to eliminate latency in an instruction thereby facilitating instruction scheduling for faster operations according to a compiler. The same architecture is also employed with respect to instruction sets for arithmetic processors that are combined with processors (see, for example, Nonpatent document 1: "IA-32 Intel(R) Architecture Software Developer's Manual Volume 1: Basic Architecture", Intel Corporation, 2004).

SUMMARY OF THE INVENTION

In recent years, the above architecture where the loading instruction and the arithmetic instruction are separate from each other has been prevailing in the art. However, the architecture is problematic in that since it is necessary to execute a loading instruction in addition to an arithmetic instruction, memory access takes some time and the program has an increased code size.

According to some integer arithmetic operations, an immediate field is provided in a certain field of an arithmetic instruction for embedding data to operate on directly in the arithmetic instruction. For supplying a floating-point number arithmetic circuit with floating-point number data, however, since even a single-precision floating-point number needs 32 bits, it is difficult to embed data to be operated on as immediate data in an instruction having a general instruction length of 32 bits.

It is desirable for the present invention to provide a floating-point number arithmetic circuit for efficiently supplying data to operate on.

According to a first embodiment of the present invention, there is provided a floating-point number arithmetic circuit including a floating-point number arithmetic unit for performing a predetermined floating-point number arithmetic operation on a floating-point number of a predetermined precision, and a converting circuit for converting data into the floating-point number of predetermined precision and supplying the floating-point number of the predetermined precision to at least one of the input terminals of the floating-point number arithmetic unit. The floating-point number arithmetic circuit thus arranged is able to perform a predetermined floating-point number arithmetic operation on supplied data.

According to a second embodiment of the present invention, there is provided a processor including an instruction decoder for decoding an instruction having an immediate field, a converting circuit for converting data contained in the immediate field of the instruction decoded by the instruction decoder into a floating-point number having a predetermined precision, a floating-point number arithmetic unit for performing a predetermined floating-point number arithmetic operation on the floating-point number having the predetermined precision from the converting circuit to either one of the input terminals of the floating-point number arithmetic unit, and a register for storing a result of the predetermined floating-point number arithmetic operation performed by the floating-point number arithmetic unit. The processor thus arranged is able to perform a predetermined floating-point number arithmetic operation on data in an immediate field of an instruction.

According to the first and second embodiments, the converting circuit may have an integer converter for converting an integer as the data into the floating-point number of the predetermined precision. With this arrangement, the predetermined floating-point number arithmetic operation may thus be performed on a supplied integer.

According to the first and second embodiments, the converting circuit may have a floating-point number converter for converting a floating-point number having a precision different from the predetermined precision as the data into the floating-point number of the predetermined precision. With this arrangement, the predetermined floating-point number arithmetic operation may thus be performed on a floating-point number having a precision different from the precision of the arithmetic unit.

According to the first and second embodiments, the converting circuit may have an integer converter for converting an integer as the data into the floating-point number of the predetermined precision, a floating-point number converter for converting a floating-point number having a precision different from the predetermined precision as the data into the floating-point number of the predetermined precision, and a converter selector for selecting either an output from the integer converter or an output from the floating-point number converter, and supplying the selected output to at least one of the input terminals of the floating-point number arithmetic unit. With this arrangement, the predetermined floating-point number arithmetic operation may thus be performed on a floating-point number having a precision different from the precision of a supplied integer or the arithmetic unit.

According to the first and second embodiments, the floating-point number arithmetic unit may further include an arithmetic selector for selecting and outputting either an output from the floating-point number arithmetic unit or an output from the converting circuit. With this arrangement, a value produced through the floating-point number arithmetic unit or a value produced not through the floating-point number arithmetic unit may be selectively output.

According to a third embodiment of the present invention, there is provided a processor including an instruction decoder for decoding an instruction of W bits (W represents an integer of 1 or greater) having an immediate field of N bits (N represents an integer of 1 or greater), a converting circuit for converting data of N bits contained in the immediate field of the instruction decoded by the instruction decoder, into a floating-point number of F bits (F represents an integer of 1 or greater), a floating-point number arithmetic unit for performing a predetermined floating-point number arithmetic operation on the floating-point number of F bits from the converting circuit to either one of the input terminals of the floating-point number arithmetic unit, and a register for storing a result of the predetermined floating-point number arithmetic operation performed by the floating-point number arithmetic unit. The processor thus arranged is able to perform an F-bit floating-point number arithmetic operation on data of N bits in an immediate field of an instruction.

According to the third embodiment, typically, the immediate field of N bits may include an immediate field of 16 bits, the instruction of W bits an instruction of 32 bits, and the floating-point number of F bits a floating-point number of 32 bits. An integer or floating-point number of 16 bits may be designated in the immediate field of 16 bits.

According to a fourth embodiment of the present invention, there is provided a processor having, as an instruction set, a floating-point number arithmetic instruction having an immediate field of N bits (N represents an integer of 1 or greater), including an instruction decoder for extracting data of N bits contained in the immediate field, a converting circuit for converting the extracted data of N bits into a floating-point number of F bits (F represents an integer of 1 or greater), and a floating-point number arithmetic unit for performing a predetermined floating-point number arithmetic operation on the floating-point number of F bits from the converting circuit to either one of the input terminals of the floating-point number arithmetic unit. It is thus possible to provide an immediate field in a floating-point number arithmetic instruction, allowing program codes and a memory to be used more efficiently.

According to the fourth embodiment, typically, the immediate field of N bits may include an immediate field of 16 bits, and the floating-point number of F bits a floating-point number of 32 bits.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1 is a block diagram of a processor according to an embodiment of the present invention;

FIG. 4 is a diagram showing meanings of exponents of 16-bit floating-point numbers according to the embodiment of the present invention;

DETAILED DESCRIPTION OF THE PREFERRED EMBODIMENT

Figure 2A:
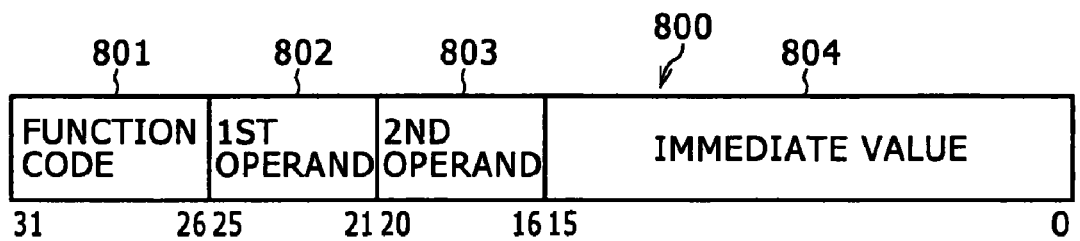
FIGS. 2A through 2F are diagrams showing an instruction format of immediate instructions according to the embodiment of the present invention.

FIG. 1 shows in block form a processor 100 according to an embodiment of the present invention. As shown in FIG. 1, the processor 100 is connected to a memory 200 by a bus 210. The processor 100 has a load-store unit 110, an instruction decoder 120, a floating-point number arithmetic circuit 160, a register file 170, and a control unit 190.

The load-store unit 110 reads an instruction of W bits (W represents an integer of 1 or greater) or floating-point number data of F bits (F represents an integer of 1 or greater) from the memory 200, or writes floating-point number data of F bits into the memory 200.

The instruction decoder 120 receives an instruction of W bits from the load-store unit 110, and decodes the instruction according to the instruction format. Decoded data from the instruction decoder 120 is transmitted as a control signal to various components of the processor 100.

The floating-point number arithmetic circuit 160 is supplied with data of N bits (represents an integer of 1 or greater) from the instruction decoder 120 and floating-point number data of F bits from the register file 170, operates on the supplied data, and outputs data of F bits.

The register file 170 holds M floating-point number data (M represents an integer of 1 or greater) of F bits. The register file 170 reads floating-point number data from and writes floating-point number data into the load-store unit 110 or the floating-point number arithmetic circuit 160. Access to the data held in the register file 170 is controlled based on the decoded data from the instruction decoder 120.

The control unit 190 is used to control the hardware modules in the processor 100.

The floating-point number arithmetic circuit 160 has a converting circuit 130, an arithmetic unit 140, and a selector 150. The converting circuit 130 comprises an integer converter 300 for converting N-bit data as an integer from the instruction decoder 120 into floating-point number data of F bits, a floating-point number converter 400 for converting N-bit data as an N-bit floating-point number from the instruction decoder 120 into F-bit floating-point number data, and a selector 135 for selecting output data from the integer converter 300 or the floating-point number converter 400. The arithmetic unit 140 operates on F-bit floating-point number data supplied thereto. The selector 150 selects either output data from the arithmetic unit 140 or output data from the converting circuit 130, and supplies the selected output data to the register file 170.

In FIG. 1, the instruction length is represented by W bits, the floating-point number data width by F bits, and the data width from the instruction decoder 120 by N bits. In the description given below, it is assumed that each of the instruction length and the floating-point number data width is typically represented by 32 bits and the data width from the instruction decoder 120 by 16 bits. However, the present invention is not limited to such configurations. The processor 100 may be arranged to convert data of N bits in the instruction length of W bits into floating-point number data of F bits.

FIGS. 2A through 2F show an instruction format of immediate instructions according to the embodiment of the present invention. As shown in FIG. 2A, an immediate instruction 800 is a 32-bit instruction having fields representing a function code 801 of 5 bits, a first operand 802 of 6 bits, a second operand 803 of 5 bits, and an immediate value 804 of 16 bits.

The function code 801 is a field representing the operation code of the instruction. The first and second operands 802, 803 represent operands of the instruction. Some immediate instructions are free of the second operand 803. The immediate value 804 is supplied as a 16-bit integer or a 16-bit floating-point number.

FIGS. 2B through 2F illustrate various instructions according to the immediate instruction format, including an immediate storage instruction (floating-point number), an immediate storage instruction (integer), an immediate addition instruction, an immediate multiplication instruction, and an immediate division instruction.

Figure 2B:
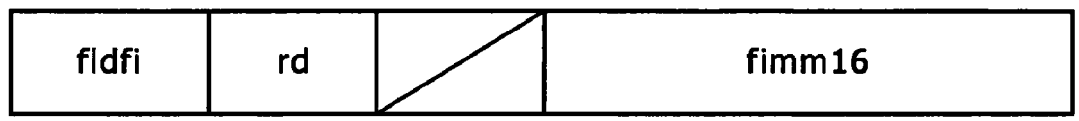

According to the immediate storage instruction (floating decimal) shown in FIG. 2B, "fldfi" is designated as the function code 801, and a register "rd" is designated as the first operand 802. A floating-point number "fimm16" of 16 bits is designated as the immediate value 804. When the immediate storage instruction (floating decimal) is executed, the 16-bit floating-point number is converted by the floating-point number converter 400 into a 32-bit floating-point number, which is stored into the register "rd" through the selectors 135, 150.

Figure 2C:

According to the immediate storage instruction (integer) shown in FIG. 2C, "fldii" is designated as the function code 801, and the register "rd" is designated as the first operand 802. An integer "iimm16" of 16 bits is designated as the immediate value 804. When the immediate storage instruction (integer) is executed, the 16-bit integer is converted by the integer converter 300 into a 32-bit floating-point number, which is stored into the register "rd" through the selectors 135, 150.

Figure 2D:

According to the immediate addition instruction shown in FIG. 2D, "faddfi" is designated as the function code 801, the register "rd" is designated as the first operand 802, and a register "rs" is designated as the second operand 803. The floating-point number "fimm16" of 16 bits is designated as the immediate value 804. When the immediate addition instruction is executed, the 16-bit floating-point number is converted by the floating-point number converter 400 into a 32-bit floating-point number, which is supplied through the selector 135 to one of the input terminals of the arithmetic unit 140. The arithmetic unit 140 adds the supplied 32-bit floating-point number to the data of the register "rs", and stores the sum into the register "rd" through the selector 150.

Figure 2E:

According to the immediate multiplication instruction shown in FIG. 2E, "fmulfi" is designated as the function code 801, the register "rd" is designated as the first operand 802, and the register "rs" is designated as the second operand 803. The floating-point number "fimm16" of 16 bits is designated as the immediate value 804. When the immediate multiplication instruction is executed, the 16-bit floating-point number is converted by the floating-point number converter 400 into a 32-bit floating-point number, which is supplied through the selector 135 to one of the input terminals of the arithmetic unit 140. The arithmetic unit 140 multiplies the data of the register "rs" by the supplied 32-bit floating-point number, and stores the product into the register "rd" through the selector 150.

Figure 2F:
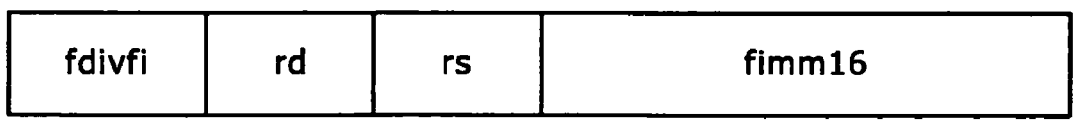

According to the immediate multiplication instruction shown in FIG. 2F, "fdivfi" is designated as the function code 801, the register "rd" is designated as the first operand 802, and the register "rs" is designated as the second operand 803. The floating-point number "fimm16" of 16 bits is designated as the immediate value 804. When the immediate division instruction is executed, the 16-bit floating-point number is converted by the floating-point number converter 400 into a 32-bit floating-point number, which is supplied through the selector 135 to one of the input terminals of the arithmetic unit 140. The arithmetic unit 140 divides the data of the register "rs" by the supplied 32-bit floating-point number, and stores the quotient into the register "rd" through the selector 150.

Figure 3A:
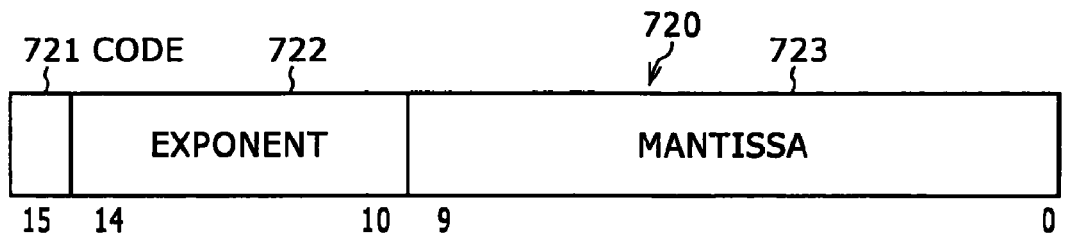
FIGS. 3A through 3F are diagrams showing examples of 16-bit floating-point numbers according to the embodiment of the present invention.

FIGS. 3A through 3F show examples of 16-bit floating-point numbers according to the embodiment of the present invention. As shown in FIG. 3A, a 16-bit floating-point number 720 includes a code part 721 of 1 bit, an exponential part 722 of 5 bits, and a mantissa part 723 of 10 bits.

The code part 721 represents the code of the numerical value, and stores either "1" indicative of being positive or "0" indicative of being negative.

The exponential part 722 represents an exponent in base "10", and has a biased expression with 15 added. Specifically, as shown in FIG. 4, an integer ranging from "−14" to "+15" representative of an exponent, or an integer of "+16" representative of positive infinity (+∞), negative infinity (−∞), or normumeric (NaN), or an integer of "−15" representative of positive zero (+0), negative zero (−0), or an unnormalized number is stored as a value to be biased in the exponential part 722.

Figure 3B:
Figure 3C:

The mantissa part 723 represents a mantissa normalized in base "2". A normalized value with the most significant bit omitted is stored in the mantissa part 723. 16-bit floating-point numbers as positive unnormalized numbers are handled as positive zero (+0) and 16-bit floating-point numbers as negative unnormalized numbers are handled as negative zero (−0). As shown in FIG. 3B or 3C, if a 16-bit floating-point number has "0" or "1" in the code part 721 and all "0s" in the exponential part 722 and the mantissa part 723, then the 16-bit floating-point number represents positive zero (+0) or negative zero (−0).

Figure 3D:
Figure 3E:
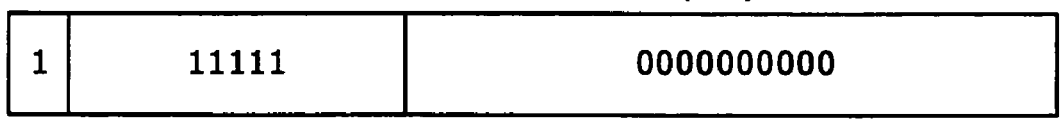
Figure 3F:
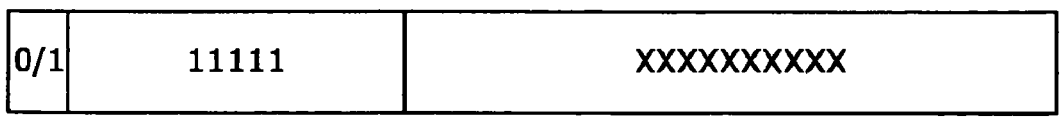

As shown in FIG. 3D or 3E, if a 16-bit floating-point number has "0" or "1" in the code part 721, "11111" in the exponential part 722, and all "0s" in the mantissa part 723, then the 16-bit floating-point number represents positive infinity (+∞) or negative infinity (−∞). As shown in FIG. 3F, if a 16-bit floating-point number has "0" or "1" in the code part 721, "11111" in the exponential part 722, and other values than "0" in the mantissa part 723, then the 16-bit floating-point number represents normumeric (NaN).

In FIGS. 3A through 3F, it is assumed that the exponential part 722 is of 5 bits, and the mantissa part 723 is of 10 bits. However, the present invention is not limited those bits, but the exponential part 722 and the mantissa part 723 may contain other combinations of bits.

Figure 5:
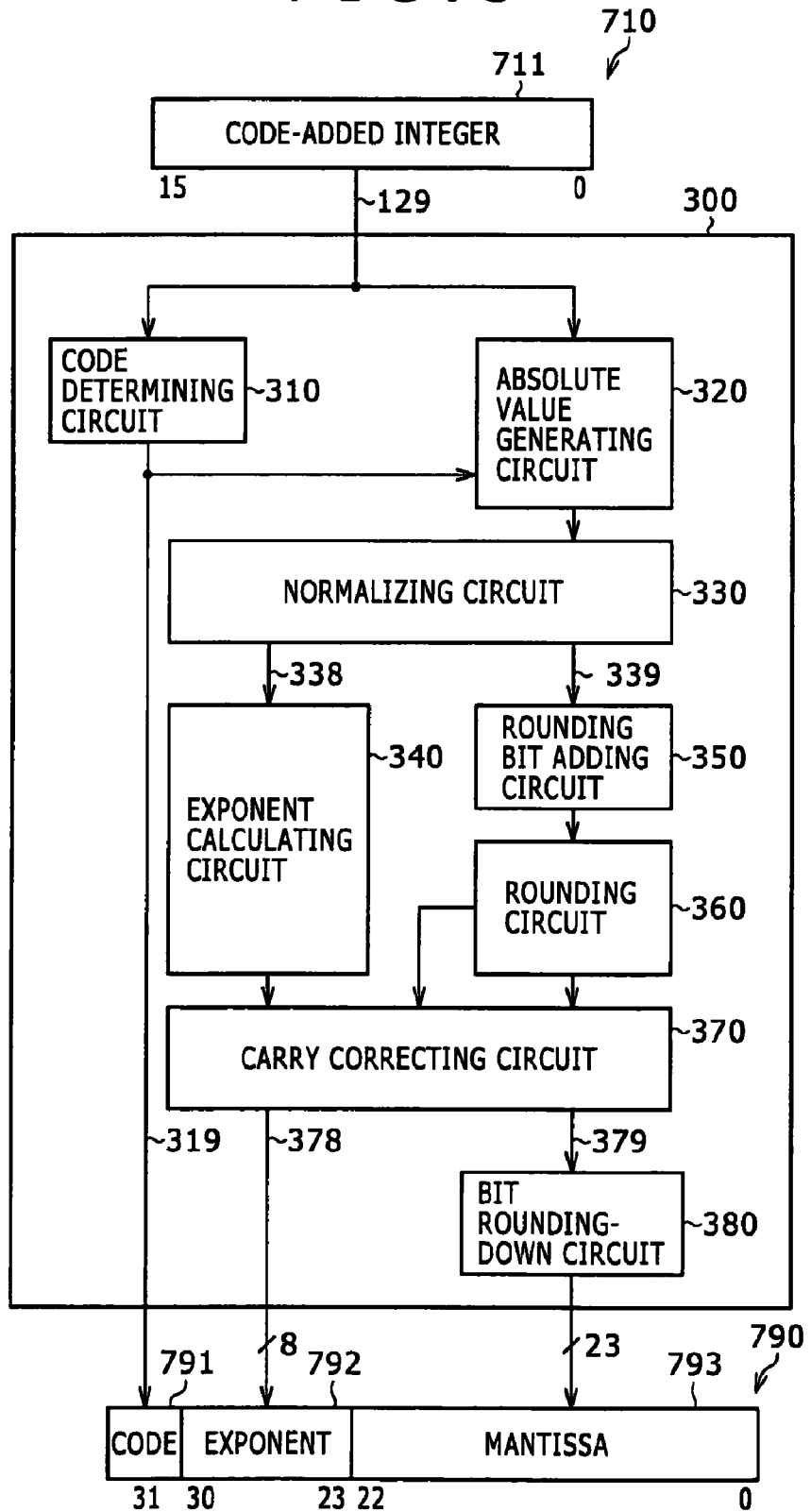
FIG. 5 is a block diagram of an integer converter according to the embodiment of the present invention.

FIG. 5 shows in block form details of the integer converter 300 according to the embodiment of the present invention. As shown in FIG. 5, the integer converter 300 serves to convert a 16-bit integer 710 that is embedded as the immediate value 804 in the immediate instruction 800 into a single-precision (32-bit) floating-point number 790 according to the IEEE 754. The integer converter 300 comprises a code determining circuit 310, an absolute value generating circuit 320, a normalizing circuit 330, an exponent calculating circuit 340, a rounding bit adding circuit 350, a rounding circuit 360, a carry correcting circuit 370, and a bit rounding-down circuit 380. The rounding mode in the integer converter 300 is in accordance with RN (Round to Nearest) of IEEE 754.

The code determining circuit 310 serves to determine the code of a code-added integer 711 in the 16-bit integer 710 that is supplied through a signal line 129. The determined code is supplied as a code 791 of the 32-bit floating-point number 790 through a signal line 319. The determined code is also used to invert a code in the absolute value generating circuit 320.

Figure 6:
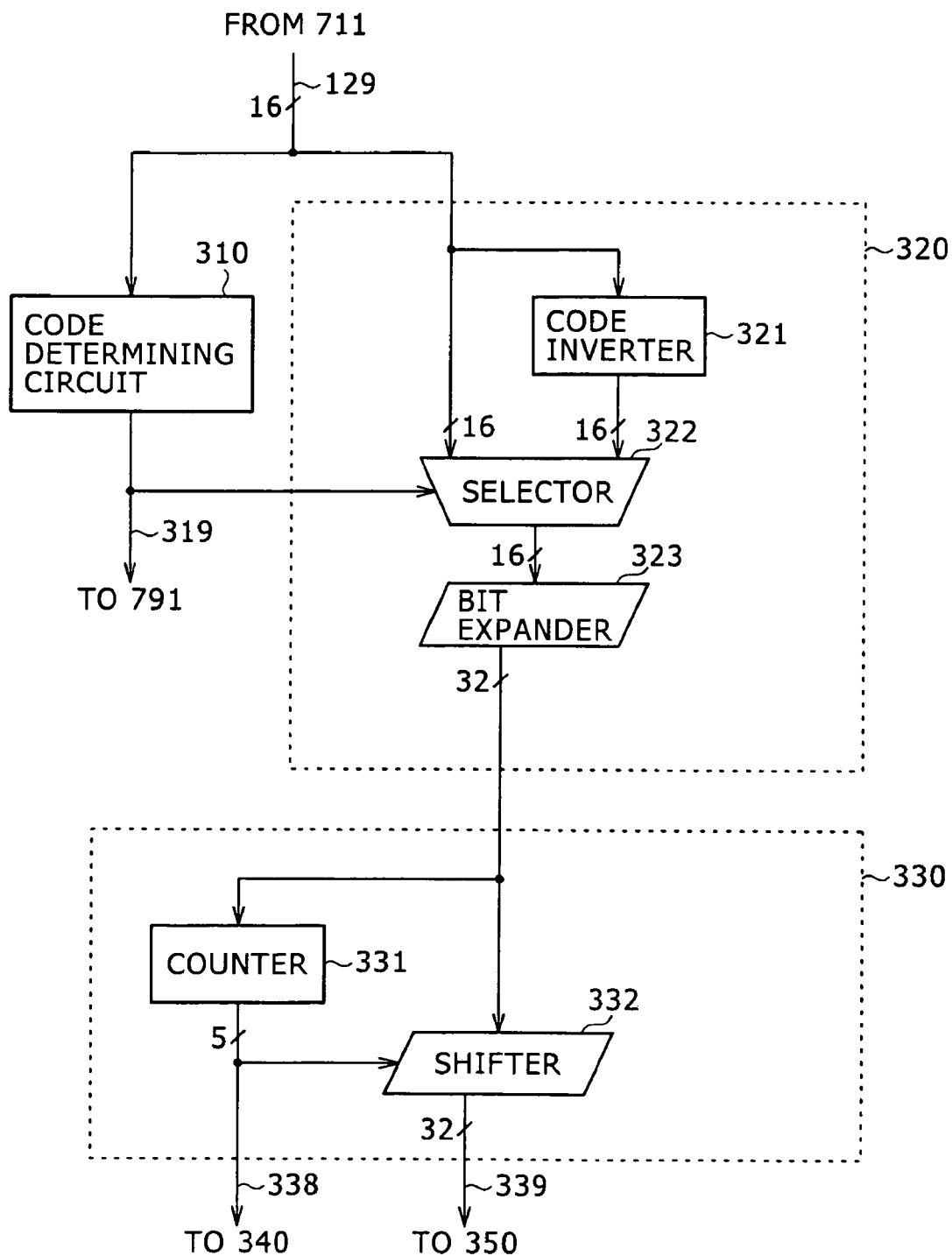
FIG. 6 is a block diagram of details of the integer converter according to the embodiment of the present invention.

The absolute value generating circuit 320 serves to output the absolute value of the code-added integer 711 in the 16-bit integer 710 that is supplied through the signal line 129, as a 32-bit absolute value. As shown in FIG. 6, the absolute value generating circuit 320 comprises a code inverter 321, a selector 322, and a bit expander 323. The code inverter 321 inverts the code of the code-added integer 711 in the 16-bit integer 710 that is supplied through the signal line 129. The selector 322 selects the input data or the output data of the code inverter 321 based on the determined code from the code determining unit 321, and outputs the absolute value of the code-added integer 711. The bit expander 323 expands the 16-bit absolute value output from the selector 322 to a 32-bit absolute value.

The normalizing circuit 330 serves to output a normalized number which represents the normalized 32-bit absolute value output from the absolute value generating circuit 320. As shown in FIG. 6, the normalizing circuit 330 comprises a counter 331 and a shifter 332. The counter 331 counts the number of successive "0s" arranged from the most significant bit toward the least significant bit of the 32-bit absolute value output from the absolute value generating circuit 320. The shifter 332 shifts leftwards the 32-bit absolute value output from the absolute value generating circuit 320 based on the count from the counter 331, and outputs the shifted value as a 32-bit normalized number. The normalized number thus obtained is supplied to the rounding bit adding circuit 350 through a signal line 339. The count from the counter 331 is supplied to the exponent calculating circuit 340 through a signal line 338.

Figure 7:
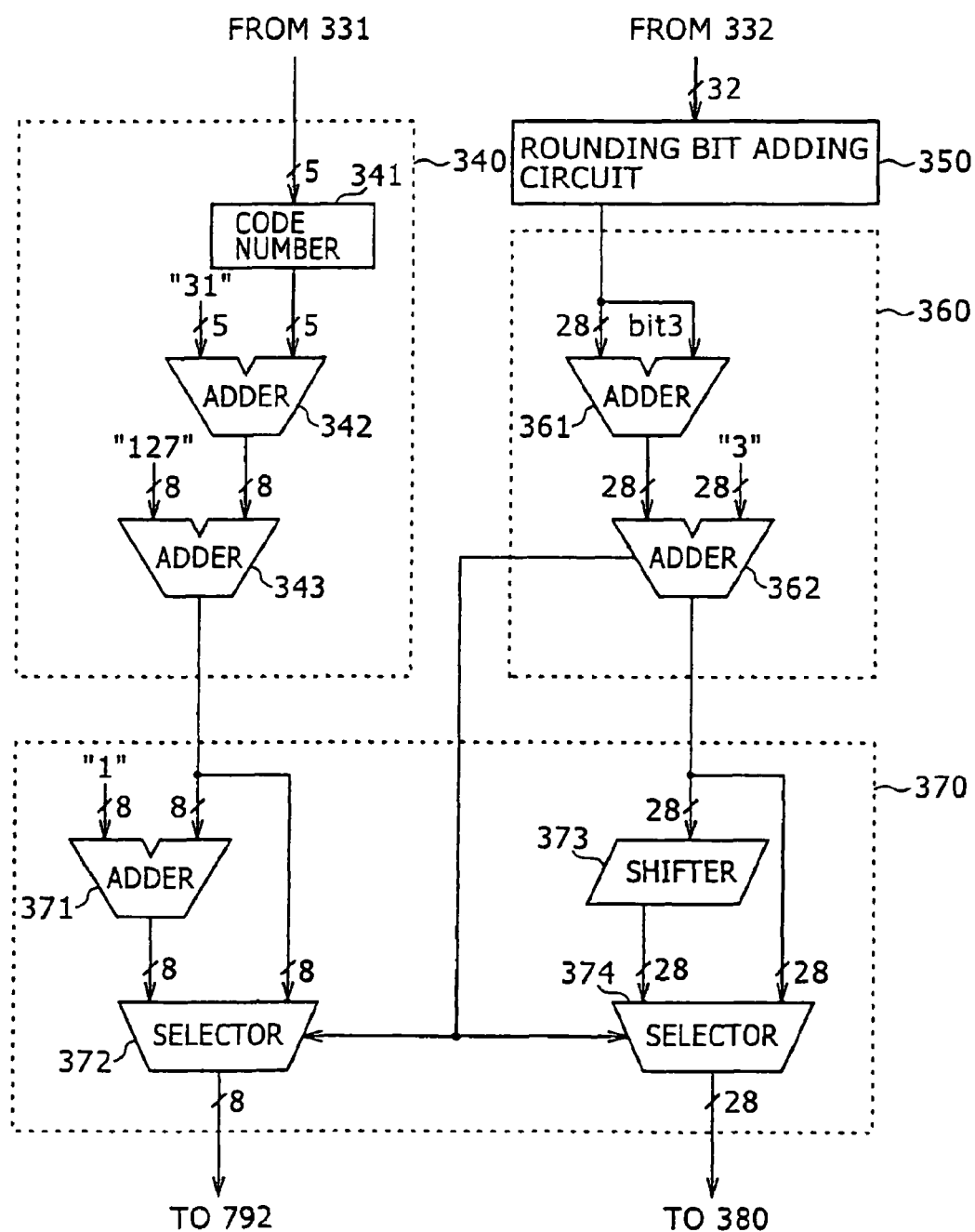
FIG. 7 is a block diagram of other details of the integer converter according to the embodiment of the present invention.

The exponent calculating circuit 340 serves to calculate the exponent of a normalized number generated by the normalizing circuit 330. As shown in FIG. 7, the exponent calculating circuit 340 comprises a code inverter 341, an adder 342, and an adder 343. The code inverter 341 serves to invert the code of the shifting count supplied from the counter 331 through the signal line 338. The adder 342 outputs a value produced by subtracting the shifting count from "31". The adder 343 adds "127" to the value output from the adder 342. In this manner, the exponent calculating circuit 340 calculates the exponent of a normalized number generated by the normalizing circuit 330. The calculated exponent is supplied to an adder 371 and a selector 372 of the carry correcting circuit 370.

Figure 8:
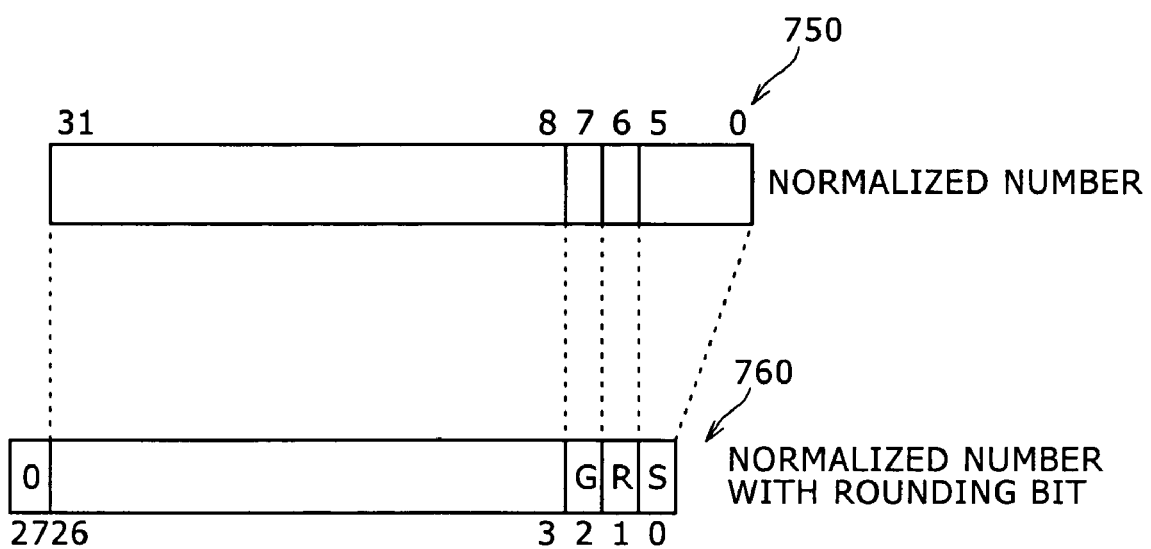
FIG. 8 is a diagram showing the manner in which a rounding bit is added to a normalized number by a rounding bit adding circuit according to the embodiment of the present invention.

The rounding bit adding circuit 350 serves to generate a rounding-bit-added normalized number from a normalized number generated by the normalizing circuit 330. Specifically, as shown in FIG. 8, a normalized number 750 generated by the normalizing circuit 330 is converted into a rounding-bit-added normalized number 760 as follows: Bits 31 trough 8 of the normalized number 750 become bits 26 through 3 of the rounding-bit-added normalized number 760. A bit 7 of the normalized number 750 becomes a Guard bit 2 of the rounding-bit-added normalized number 760. A bit 6 of the normalized number 750 becomes a Round bit 1 of the rounding-bit-added normalized number 760. A bit produced by ORing bits 5 through 0 of the normalized number 750 becomes a Sticky bit 0 of the rounding-bit-added normalized number 760. The most significant bit 27 of the rounding-bit-added normalized number 760 is set to "0" in order for the rounding circuit 360 to be able to detect a carry.

Referring back to FIG. 7, the rounding circuit 360, which serves to perform a rounding process, has adders 361, 362. The adder 361 adds, to the rounding-bit-added normalized number 760 from the rounding bit adding circuit 350, the value of the bit 3 thereof. The adder 362 adds "3" to the sum produced by the adder 361. The sum produced by the adder 362 is supplied as data to a shifter 373 and a selector 374 of the carry correcting circuit 370. Carry information indicative of whether there is a carry from the addition or not is supplied as a selecting signal to the selectors 372, 374 of the carry correcting circuit 370.

The carry correcting circuit 370 serves to correct an exponent calculated by the exponent calculating circuit 340 and a normalized number rounded by the rounding circuit 360. As described above, the carry correcting circuit 370 has the adder 371, the selector 372, the shifter 373, and the selector 374. The adder 371 adds "1" to the exponent calculated by the exponent calculating circuit 340. The selector 372 selects the output from the adder 371 if there is a carry from the addition performed by the adder 362, and selects the exponent from the exponent calculating circuit 340 if there is no carry from the addition performed by the adder 362. The selector 372 supplies its output as an exponent 792 of the 32-bit floating-point number 790 through a signal line 378.

The shifter 373 shifts the normalized number from the rounding circuit 360 by one bit rightwards. The selector 374 outputs the output from the shifter 373 if there is a carry from the addition performed by the adder 362, and selects the normalized number from the rounding circuit 360 if there is no carry from the addition performed by the adder 362. The selector 372 supplies its output to the bit rounding-down circuit 380 through a signal line 379.

Referring back to FIG. 5, the bit rounding-down circuit 380 rounds down bits 27, 26, 2 through 0 of the rounded normalized number supplied from the carry correcting circuit 370, generating a mantissa of 23 bits. The bit rounding-down circuit 380 supplies its output as a mantissa 793 of the 32-bit floating-point number 790.

Figure 9:
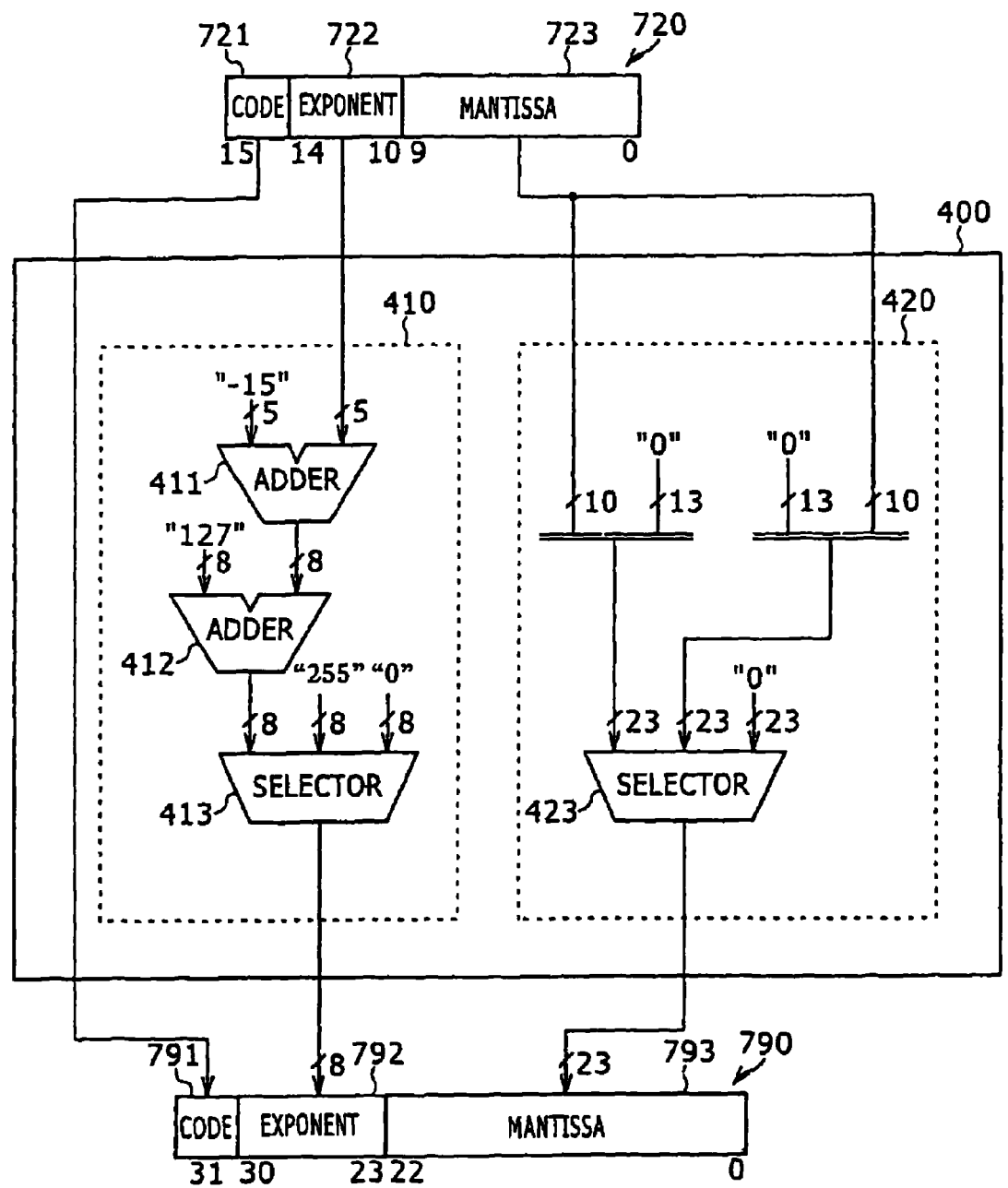
FIG. 9 is a block diagram of a floating-point number converter according to the embodiment of the present invention.

FIG. 9 shows in block form details of the floating-point number converter 400 according to the embodiment of the present invention. The floating-point number converter 400 serves to convert a 16-bit floating-point number 720 into a 32-bit floating point number 790. The floating-point number converter 400 has an exponent converting circuit 410 and a mantissa converting circuit 420.

The exponent converting circuit 410 serves to convert an exponent 722 of the 16-bit floating-point number 720 into an exponent 792 of the 32-bit floating point number 790. The exponent converting circuit 410 comprises adders 411, 412 and a selector 413. The adder 411 subtracts "15" as a biasing value of the 16-bit floating-point number 720 from the exponent 722 of the 16-bit floating-point number 720. The adder 412 adds "127" as a biasing value of the 32-bit floating point number 790 to the sum from the adder 411.

The selector 413 selects either the sum from the adder 412, a number "255", or a number "0" depending on the 16-bit floating-point number 720. Specifically, if the 16-bit floating-point number 720 represents positive infinity (+∞), negative infinity (−∞), or normumeric (NaN), then the selector 413 selects "255" indicative of infinity or normumeric as the exponent 792 of the 32-bit floating-point number 790. If the 16-bit floating-point number 720 represents positive zero (+0), negative zero (−0), or an unnormalized number, then the selector 413 selects "0" indicative of zero as the exponent 792 of the 32-bit floating-point number 790. If the 16-bit floating-point number 720 represents a floating-point number other than those values, then the selector 413 selects the sum from the adder 412 as the exponent 792 of the 32-bit floating-point number 790.

The mantissa converting circuit 420 serves to convert a mantissa 723 of the 16-bit floating-point number 720 into a mantissa 793 of the 32-bit floating point number 790. The mantissa converting circuit 420 has a selector 423. The selector 423 selects either a number produced by supplementing the mantissa 723 of 10 bits with "0" of 13 bits next to the low-order position thereof, or a number produced by supplementing the mantissa 723 of 10 bits with "0" of 13 bits next to the high-order position thereof, or "0" of 23 bits, depending on the 16-bit floating-point number 720. Specifically, if the 16-bit floating-point number 720 represents positive infinity (+∞), negative infinity (−∞), or normumeric (NaN), then the selector 423 selects the number produced by supplementing the mantissa 723 of 10 bits with "0" of 13 bits next to the high-order position thereof as the mantissa 793 of the 32-bit floating point number 790. If the 16-bit floating-point number 720 represents positive zero (+0), negative zero (−0), or an unnormalized number, then the selector 423 selects "0" of 23 bits as the mantissa 793 of the 32-bit floating point number 790. If the 16-bit floating-point number 720 represents a floating-point number other than those values, then the selector 423 selects the number produced by supplementing the mantissa 723 of 10 bits with "0" of 13 bits next to the low-order position thereof.

The floating-point number converter 400 uses the code 721 of the 16-bit floating-point number 720 directly as the code 791 of the 32-bit floating-point number 790.

Figure 10:
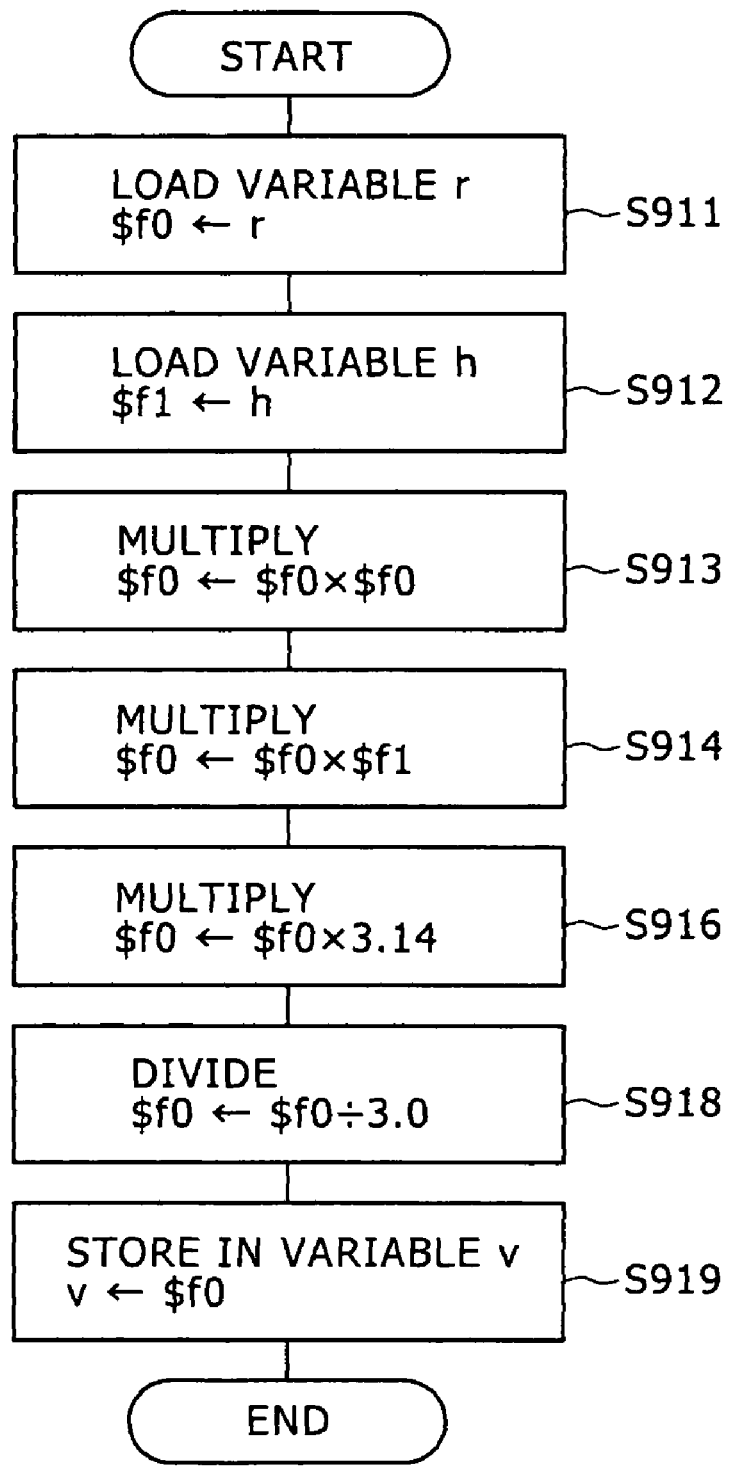
FIG. 10 is a flowchart of a program code sequence according to the embodiment of the present invention.

FIG. 10 shows a program code sequence according to the embodiment of the present invention. In FIG. 10, a program for determining the volume of a circular cone, for example, is cited as the program code sequence. According to the program, the volume v of a circular cone is determined based on the radius r and the height h of the circular cone by the following equation:

$$v \leftarrow (\pi \times r^2 \times h)/3$$

First, the data stored in a memory area for a variable r is loaded into a register $f0 in step S911. Then, the data stored in a memory area for a variable h is loaded into a register $f1 in step S912. The data stored in the register $f0 is multiplied by the data stored in the register $f0, and the product is stored in the register $f0 in step S913. The multiplication represents the calculation of the square of the radius r.

Then, the data stored in the register $f0 is multiplied by the data stored in the register $f1, and the product is stored in the register $f0 in step S914. The multiplication represents multiplying the square of the radius r by the height h.

Then, the data stored in the register $f0 is multiplied by an immediate value of 3.14, and the product is stored in the register $f0 in step S916. The immediate multiplication instruction (fmulfi) described above with reference to FIG. 2E may be used for the multiplication. Specifically, both the first and second operands 802, 803 are set to the data stored in the register $f0, and the immediate value 804 is set to "3.14" of 16 bits. Therefore, the desired operation can be realized by a single instruction.

Then, the data stored in the register $f0 is divided by an immediate value of 3.0, and the quotient is stored in the register $f0 in step S918. The immediate division instruction (fdivfi) described above with reference to FIG. 2F may be used for the division. Specifically, both the first and second operands 802, 803 are set to the data stored in the register $f0, and the immediate value 804 is set to "3.0" of 16 bits. Therefore, the desired operation can be realized by a single instruction.

Finally, the data stored in the register $f0 is stored in a memory area for a variable v in step S919. Consequently, the calculated volume of the circular cone is stored in the memory area for the variable v.

Figure 11:
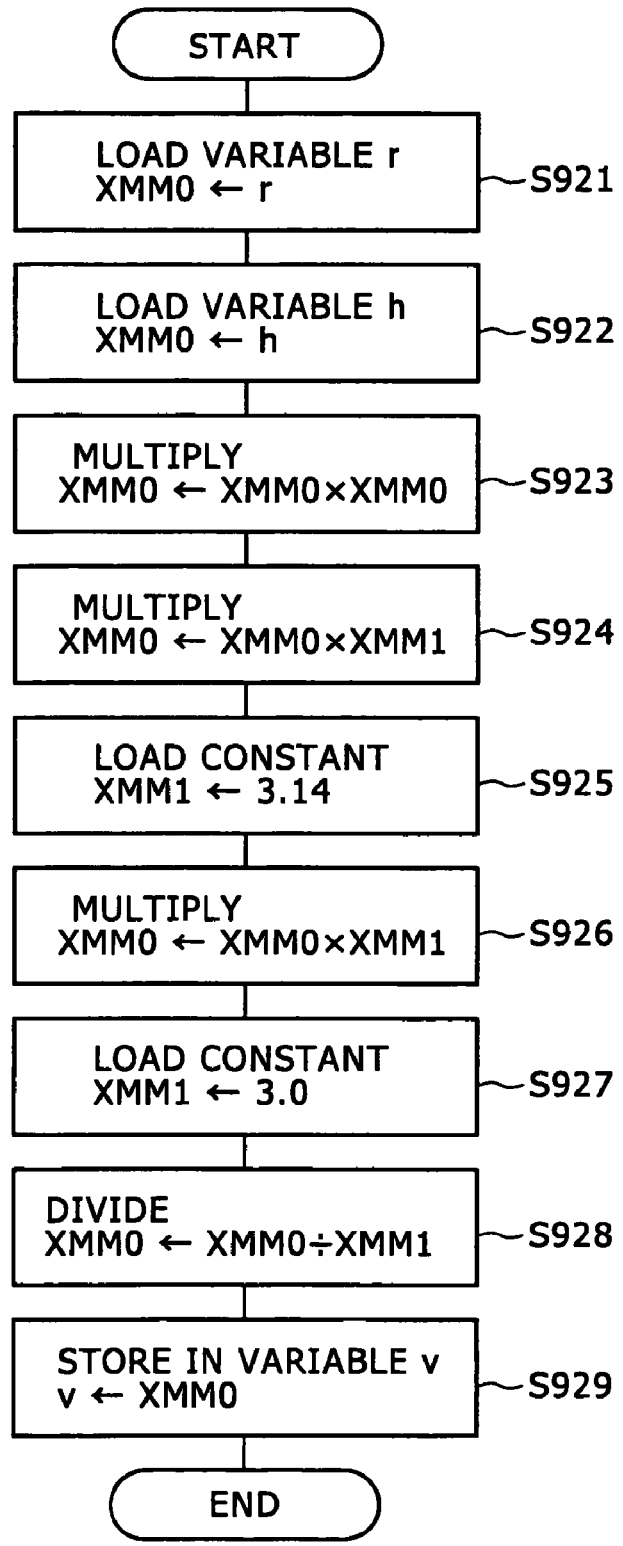
FIG. 11 is a flowchart of a conventional program code sequence.

FIG. 11 shows a conventional program code sequence. An SSE instruction group (Streaming SIMD Extension instructions) disclosed in Nonpatent document 1 referred to above is used as an example of an instruction set for the conventional program code sequence. In FIG. 11, a program for determining the volume of a circular cone is used as the conventional program code sequence.

First, the data stored in the memory area for the variable r is loaded into a register XMM0 in step S921. Then, the data stored in the memory area for the variable h is loaded into a register XMM1 in step S922. The data stored in the register XMM0 is multiplied by the data stored in the register XMM0, and the product is stored in the register XMM0 in step S923. The multiplication represents the calculation of the square of the radius r.

Then, the data stored in the register XMM0 is multiplied by the data stored in the register XMM1, and the product is stored in the register XMM0 in step S924. The multiplication represents multiplying the square of the radius r by the height h.

The data stored in a memory area for a constant pi (3.14) is loaded into the register XMM1 in step S925. Thereafter, the data stored in the register XMM0 is multiplied by the data stored in the register XMM1, and the product is stored in the register XMM0 in step S926.

The data stored in a memory area for a constant dv (3.0) is loaded into the register XMM1 in step S927. Thereafter, the data stored in the register XMM0 is divided by the data stored in the register XMM1, and the quotient is stored in the register XMM0 in step S928.

Finally, the data stored in the register XMM0 is stored in the memory area for the variable v in step S929. Consequently, the calculated volume of the circular cone is stored in the memory area for the variable v.

A comparison of the program code sequences shown in FIGS. 10 and 11 indicates that the conventional program code sequence shown in FIG. 11 requires extra instructions for loading constants from the memory areas in steps S925, S927. According to the program code sequence shown in FIG. 10, since the constants are embedded as immediate values in the multiplication instruction (step S916) and the division instruction (step S918), no instructions for loading those constants are required, and hence the program code sequence is shorter.

According to the embodiment of the present invention, as described above, the floating-point number arithmetic circuit 160 has the integer converter 300 for converting the 16-bit integer 710 into the 32-bit floating-point number 790, and the floating-point number converter 400 for converting the 16-bit floating-point number 720 into the 32-bit floating-point number 790. With this arrangement, the 16-bit immediate value 804 of the immediate instruction 800 can be converted into the 32-bit floating-point number 790 for a desired processing operation.

More specifically, first, loading instructions for loading numerical data from the memory can be reduced to reduce the code size of the program. Secondly, since loading instructions are reduced, it is not necessary to wait for data from the memory, and the floating-point number arithmetic circuit can be used more efficiently. Thirdly, since loading instructions are reduced, the number of times that the memory is accessed is reduced, and the bus between the floating-point number arithmetic circuit and the memory can be used more efficiently. Fourthly, inasmuch as a floating-point number of 32 bits is embedded as an immediate value of 16 bits in an instruction, the memory can be used more efficiently. Fifthly, because immediate values are used, registers for storing constants are not required, and hence registers can be used more efficiently.

In the illustrated embodiment of the present invention, the arithmetic unit 140 has been described as a two-input arithmetic unit. However, the arithmetic unit 140 may be a three-input arithmetic unit. Furthermore, in the illustrated embodiment, the converting circuit 130 is connected to one of the input terminals of the arithmetic unit 140. However, the converting circuit 130 may be connected to each of plural input terminals of the arithmetic unit 140.

The embodiment of the present invention represents an exemplification of the present invention, and has specific details associated with claimed elements referred to in the scope of claims described below. The present invention is not limited to the illustrated embodiment, and various changes and modifications may be made therein without departing from the scope of the invention.

Specifically, in claim 1, a floating-point number arithmetic unit corresponds to the arithmetic unit 140, for example, and a converting circuit to the converting circuit 130, for example.

In claim 2 or 7, an integer converter corresponds to the integer converter 300, for example.

In claim 3 or 8, a floating-point number converter corresponds to the floating-point number converter 400, for example.

In claim 4 or 9, an integer converter corresponds to the integer converter 300, for example, a floating-point number converter to the floating-point number converter 400, for example, and a converter selector to the selector 135, for example.

In claim 5 or 10, an arithmetic selector corresponds to the selector 150, for example.

In claim 6, 11, 12, 13, or 14, an instruction decoder corresponds to the instruction decoder 120, for example, a converting circuit to the converting circuit 130, for example, a floating-point number arithmetic unit to the arithmetic unit 140, for example, and a register to the register file 170, for example.

In claim 15 or 16, an instruction decoder corresponds to the instruction decoder 120, for example, a converting circuit to the converting circuit 130, for example, and a floating-point number arithmetic unit to the arithmetic unit 140, for example.

The principles of the present invention are applicable to a floating-point number arithmetic circuit or a processor having floating-point number arithmetic instructions.

Although a certain preferred embodiment of the present invention has been shown and described in detail, it should be understood that various changes and modifications may be made therein without departing from the scope of the appended claims.

What is claimed is:

1. A floating-point number arithmetic circuit comprising:
an instruction decoder decoding an instruction having an immediate field, wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and
the floating-point number arithmetic unit, configured with a plurality of input terminals, performing a predetermined floating-point number arithmetic operation on a floating-point number of a predetermined precision;
the converting circuit converting embedded data into said floating-point number of predetermined precision and supplying said floating-point number of said predetermined precision to one of the plurality of input terminals of said floating-point number arithmetic unit,
wherein said converting circuit has an integer converter converting an integer type as said embedded data into said floating-point number of said predetermined precision,
a floating-point number converter converting a floating-point number type having a precision different from said predetermined precision as said embedded data into said floating-point number of said predetermined precision, and
the converter selector selecting either an output from said integer converter or an output from said floating-point number converter based on the type of the embedded data, and supplying the selected output to one of the plurality of input terminals of said floating-point number arithmetic unit; and
the arithmetic selector selecting and outputting either an output from said floating-point number arithmetic unit or an output from said converting circuit and supplies the selected output to a register file.

2. A processor comprising:
an instruction decoder decoding an instruction having an immediate field, wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and
the converting circuit converting embedded data contained in said immediate field of the instruction decoded by said instruction decoder into a floating-point number having a predetermined precision,
wherein said converting circuit has an integer converter converting an integer type contained in said immediate field into said floating-point number having the predetermined precision,
a floating-point number converter converting a floating-point number type in said immediate field and having a precision different from said predetermined precision into said floating-point number of said predetermined precision, and
the converter selector selecting either an output from said integer converter or an output from said floating-point number converter based on the type of the embedded data, and supplying the selected output to one of the plurality of input terminals of said floating-point number arithmetic unit; and
the floating-point number arithmetic unit, configured with a plurality of input terminals, performing a predetermined floating-point number arithmetic operation on said floating-point number of a predetermined precision from said converting circuit to one of the plurality of input terminals of said floating-point number arithmetic unit;

the arithmetic selector selecting and outputting either an output from said floating-point number arithmetic unit or an output from said converting circuit; and a register storing a result of the predetermined floating-point number arithmetic operation performed by said floating-point number arithmetic unit wherein the register writes another floating-point number to another of the plurality of input terminals of said floating-point number arithmetic unit.

3. A processor comprising:

an instruction decoder decoding an instruction of W bits (W represents an integer of 1 or greater) having an immediate field of N bits (N represents an integer of 1 or greater), wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting embedded data of N bits contained in said immediate field of the instruction decoded by said instruction decoder into a floating-point number of F bits (F represents an integer of 1 or greater),
  wherein said converting circuit has an integer converter converting an integer type contained in said immediate field into said floating-point number having the predetermined precision of F bits,
  a floating-point number converter converting a floating-point number type in said immediate field and having a precision different from said predetermined precision into said floating-point number of said predetermined precision of F bits, and
  the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of F bits from said converting circuit to one of the plurality of input terminals of said floating-point number arithmetic unit;

the arithmetic selector selecting and outputting either an output from said floating-point number arithmetic unit or an output from said converting circuit; and a register storing a result of the predetermined floating-point number arithmetic operation performed by said floating-point number arithmetic unit wherein the register writes another floating-point number to another of the plurality of input terminals of said floating-point number arithmetic unit.

4. A processor comprising:

an instruction decoder decoding an instruction of 32 bits having an immediate field of 16 bits, wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting an integer or floating-point number of 16 bits contained in the immediate field of the instruction decoded by said instruction decoder into a floating-point number of 32 bits,
  wherein said converting circuit has an integer converter converting an integer type contained in said immediate field into said floating-point number having the predetermined precision of 32 bits,
  a floating-point number converter converting a floating-point number type in said immediate field and having a precision different from said predetermined precision into said floating-point number of said predetermined precision of 32 bits, and
  the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of 32 bits from said converting circuit to one of the plurality of input terminals of said floating-point number arithmetic unit;

the arithmetic selector selecting and outputting either an output from said floating-point number arithmetic unit or an output from said converting circuit; and a register storing a result of the predetermined floating-point number arithmetic operation performed by said floating-point number arithmetic unit wherein the register writes another floating-point number to another of the plurality of input terminals of said floating-point number arithmetic unit.

5. A processor comprising:

an instruction decoder decoding an instruction of 32 bits having an immediate field of 16 bits, wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting an integer of 16 bits contained in the immediate field of the instruction decoded by said instruction decoder into a floating-point number of 32 bits,
  wherein said converting circuit has an integer converter converting an integer type contained in said immediate field into said floating-point number having the predetermined precision of 32 bits,
  a floating-point number converter converting a floating-point number type in said immediate field and having a precision different from said predetermined precision into said floating-point number of said predetermined precision of 32 bits, and
  the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of 32 bits from said converting circuit to one of the plurality of input terminals of said floating-point number arithmetic unit;

the arithmetic selector selecting and outputting either an output from said floating-point number arithmetic unit or an output from said converting circuit; and a register storing a result of the predetermined floating-point number arithmetic operation performed by said floating-point number arithmetic unit wherein the register writes another floating-point number to another of the plurality of input terminals of said floating-point number arithmetic unit.

6. A processor comprising:

an instruction decoder decoding an instruction of 32 bits having an immediate field of 16 bits, wherein the instruction performs an arithmetic operation on an embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting a floating-point number of 16 bits contained in the immediate field of the instruction decoded by said instruction decoder into a floating-point number of 32 bits, wherein said converting circuit has an integer converter converting an integer type contained in said immediate field into said floating-point number having the predetermined precision of 32 bits, a floating-point number converter converting a floating-point number type in said immediate field and having a precision different from said predetermined precision into said floating-point number of said predetermined precision of 32 bits, and the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of 32 bits from said converting circuit to one of the plurality of input terminals of said floating-point number arithmetic unit;

the arithmetic selector selecting and outputting either an output from said floating-point number arithmetic unit or an output from said converting circuit; and a register storing a result of the predetermined floating-point number arithmetic operation performed by said floating-point number arithmetic unit wherein the register writes another floating-point number to another of the plurality of input terminals of said floating-point number arithmetic unit.

7. A processor having, as an instruction set, a floating-point number arithmetic instruction having an immediate field of N bits (N represents an integer of 1 or greater), comprising:

an instruction decoder extracting an embedded data of N bits contained in said immediate field, wherein the instruction performs an arithmetic operation on the embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting the extracted data of N bits into a floating-point number of F bits (F represents an integer of 1 or greater), wherein said converting circuit has an integer converter converting an integer type contained in said immediate field into said floating-point number having the predetermined precision of F bits, a floating-point number converter converting a floating-point number type in said immediate field and having a precision different from said predetermined precision into said floating-point number of said predetermined precision of F bits, and the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of F bits from said converting circuit to one of the plurality of input terminals of said floating-point number arithmetic unit;

the arithmetic selector selecting and outputting either an output from said floating-point number arithmetic unit or an output from said converting circuit and supplies the selected output to a register file.

8. A processor having, as an instruction set, a floating-point number arithmetic instruction having an immediate field of 16 bits, comprising:

an instruction decoder extracting an embedded data of 16 bits contained in said immediate field, wherein the instruction performs an arithmetic operation on the embedded data contained in the immediate field, wherein the instruction decoder provides the embedded data to a converting circuit as one of an integer type or a floating-point number type, and provides control signals to a converter selector, an arithmetic selector, a floating-point number arithmetic unit, based on decoded instruction; and the converting circuit converting the extracted data of 16 bits into a floating-point number of 32 bits, wherein said converting circuit has an integer converter converting an integer type contained in said immediate field into said floating-point number having the predetermined precision of 32 bits, a floating-point number converter converting a floating-point number type in said immediate field and having a precision different from said predetermined precision into said floating-point number of said predetermined precision of 32 bits, and the converter selector selecting either an output from said integer converter or an output from said floating-point number converter based on the type of the embedded data, and supplying the selected output to one of the plurality of input terminals of said floating-point number arithmetic unit; and the floating-point number arithmetic unit, configured with a plurality of input terminals, performing a predetermined floating-point number arithmetic operation on said floating-point number of 32 bits from said converting circuit to one of the plurality of input terminals of said floating-point number arithmetic unit;

the arithmetic selector selecting and outputting either an output from said floating-point number arithmetic unit or an output from said converting circuit.

9. The floating-point number arithmetic circuit according to claim 1, further comprising:
a register file that writes another floating-point number to another of the plurality of input terminals of said floating-point number arithmetic unit.

10. The processor according to claim 7, further comprising:
a register file that writes another floating-point number to another of the plurality of input terminals of said floating-point number arithmetic unit.

11. The processor according to claim 8, further comprising:
a register file that writes another floating-point number to another of the plurality of input terminals of said floating-point number arithmetic unit.

* * * * *